United States Patent [19]
Brown

[11] Patent Number: 5,668,326
[45] Date of Patent: Sep. 16, 1997

[54] METHOD AND APPARATUS FOR DETECTING AND ALIGNING A SIGNAL

[75] Inventor: Alvin E. Brown, Santa Cruz, Calif.

[73] Assignee: Dieterich Technology Holding Corp.

[21] Appl. No.: 720,790

[22] Filed: Oct. 4, 1996

[51] Int. Cl.$^6$ ............................................. G02F 2/66
[52] U.S. Cl. ............................. 73/861.28; 73/861.27
[58] Field of Search ........................... 73/861.27, 861.28, 73/861.29, 861.31

[56] References Cited

U.S. PATENT DOCUMENTS

| | | | |
|---|---|---|---|
| 4,183,244 | 1/1980 | Kohno et al. | 73/861.28 |
| 4,384,491 | 5/1983 | Brown et al. | 73/861.28 |
| 4,607,520 | 8/1986 | Dam | 73/861.28 X |
| 5,178,018 | 1/1993 | Gill | 73/861.28 |
| 5,325,726 | 7/1994 | Krieg et al. | 73/861.27 X |

*Primary Examiner*—Richard Chilcot
*Assistant Examiner*—Elizabeth L. Dougherty
*Attorney, Agent, or Firm*—Richard W. Hanes

[57] ABSTRACT

A method of detecting and aligning a signal in an ultrasonic flow meter (18) generates an oscillator signal (50) and a transmit sequence (54) on a first predetermined trigger point (55) of the oscillator signal (50). The transmit sequence (54) is used to drive a transmit transducer (14, 16) to form a transmit waveform (60). The transmit waveform (60) is received by a receive transducer (14, 16) to form a received waveform. The received waveform is processed to form a received sequence (62). The received sequence (62) is then processed to sense an anomaly (80).

19 Claims, 6 Drawing Sheets

METHOD AND APPARATUS FOR DETECTING AND ALIGNING A SIGNAL

FIELD OF THE INVENTION

The present invention relates generally to the field of ultrasonic flow meters and more specifically to a method and apparatus for detecting and aligning a signal in an ultrasonic flow meter.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive fluids.

Ultrasonic flow meters have a pair of transducers that are placed on either side of the flow path of a fluid flowing through a pipe. The transducers are pointed at each other and placed on either side of the flow path of a fluid flowing through a pipe. The transducers are pointed at each other and the line between them has a component in the direction of the fluid flow. The principle used to detect flow rates is that the transit time of an ultrasonic packet will increase in the upstream and decrease in the downstream path. The amount by which the transit time changes is directly proportional to the flow rate. Generally, the signal is detected and aligned by having an oscillator that is used to trigger a transmit transducer to launch an ultrasonic packet that is received by a receive transducer. The oscillator's frequency is adjusted so that transit time is an integer multiple of the period of the oscillator signal. This allows the arrival of the ultrasonic packet to be compared with a rising edge of the oscillator signal for adjusting the oscillator signal. Flow rate determination is facilitated by having an oscillator signal with a period that is proportional to the transit time. Unfortunately, noise obscures the arrival time of the ultrasonic packet. If the noise is large enough, it completely hides the signal. This results in false and missed detections. Smaller amounts of noise cause jitter in detecting when the ultrasonic packet arrived.

Thus there exist a need for a method and apparatus that can detect an ultrasonic packet in the presence of noise.

SUMMARY OF THE INVENTION

A method of detecting and aligning a signal, in an ultrasonic flow meter, that can detect a signal in the presence of noise generates an oscillator signal and a transmit sequence on a first predetermined trigger point of the oscillator signal. The transmit sequence is used to drive a transmit transducer to form a transmit waveform. The transmit waveform is received by a receive transducer to form a received waveform. The received waveform is processed to form a received sequence. The received sequence is then processed to sense an anomaly.

BRIEF DESCRIPTION OF THE DRAWINGS

FIG. 3 is a timing diagram of a portion of a process of detecting and aligning a signal;

DETAILED DESCRIPTION OF THE DRAWINGS

Figure 1:
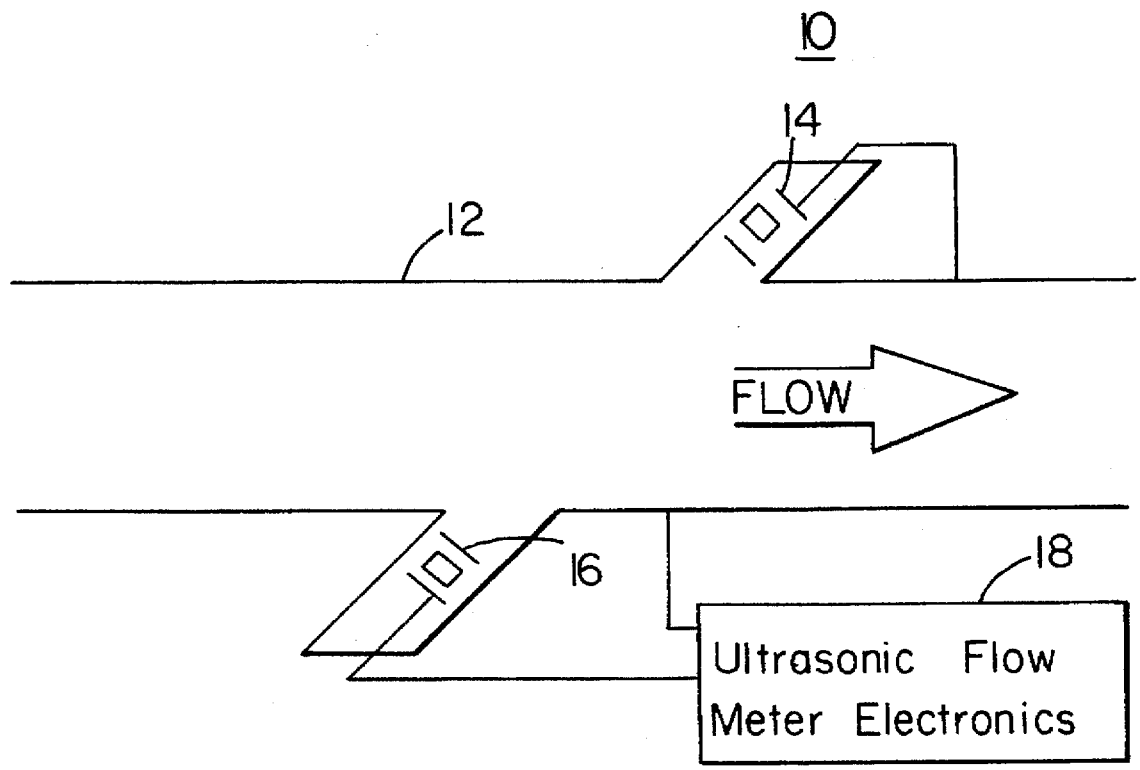
FIG. 1 is a schematic diagram of an ultrasonic flow meter.

An ultrasonic flow meter 10 attached to a pipe 12 having a fluid flowing through it is shown in FIG. 1. The ultrasonic flow meter has a pair of transducers 14, 16. The pair of transducers 14, 16 are coupled to the ultrasonic flow meter electronics 18, that generates, detects and aligns an ultrasonic pulse.

Figure 2:
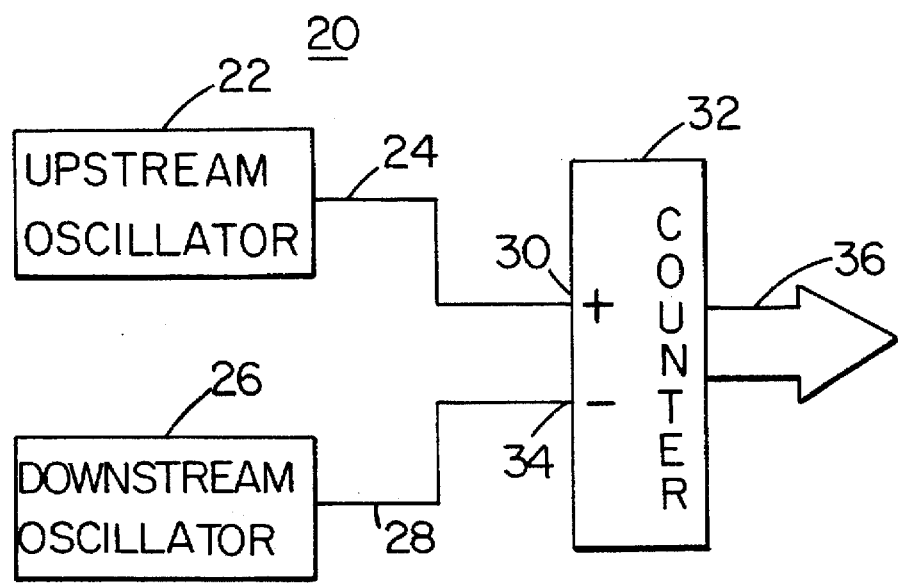
FIG. 2 is a block diagram of the ultrasonic flow meter.
Figure 1:
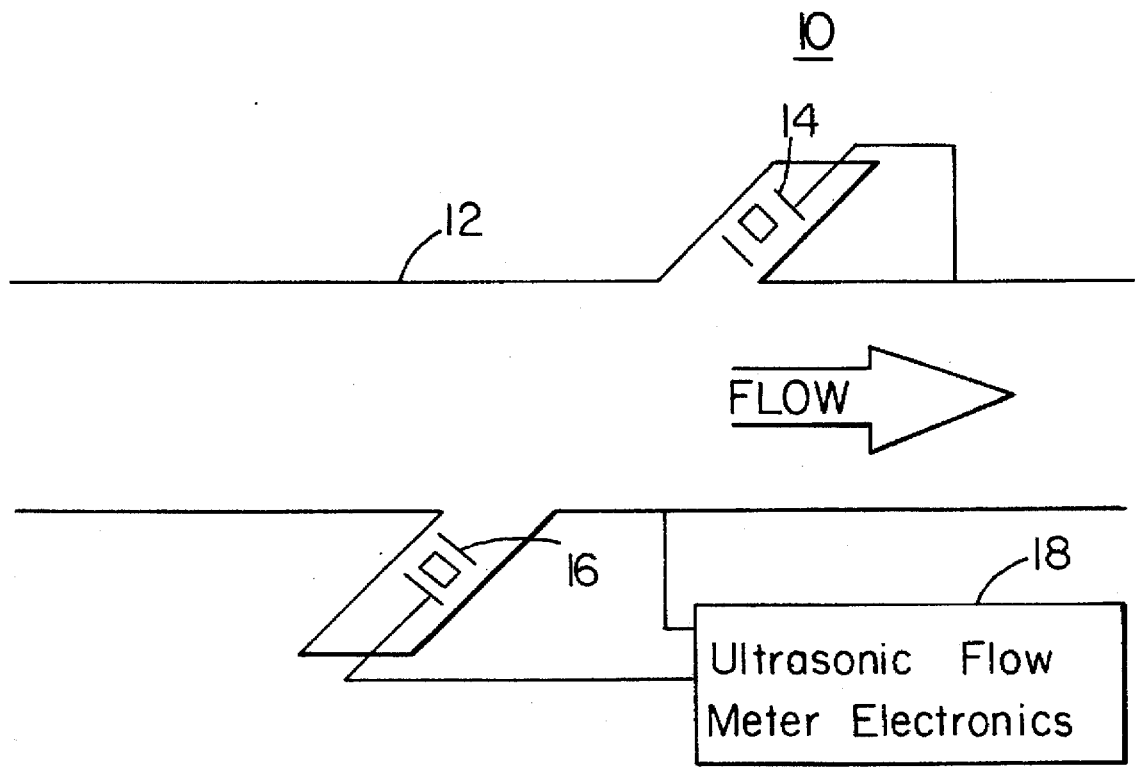
Figure 2:
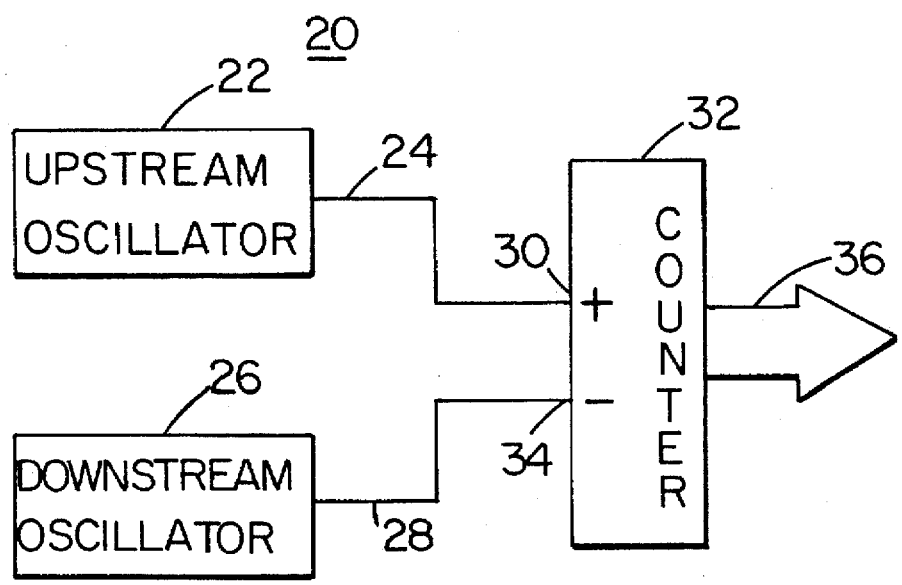

FIG. 2 a block diagram of the ultrasonic flow meter electronics 18 connected to the pair of transducers 14, 16. An upstream voltage controlled oscillator 20 and a downstream voltage controlled oscillator 22 are alternatively used to drive a transmit transducer 14, 16. The voltage controlled oscillators (oscillator signal, oscillator) 20, 22 are connected to a switch 24 that couples the oscillator signal to a divider 26. The divider 26 divides the oscillator signal down that is then coupled to a transmitter 28, a receiver (receiver electronics) 30 and a detection and comparison electronics 32. The detection and comparison electronics 32 generates an early-late control signal 34 that is used to drive a controller 36, 38 that controls the voltage controlled oscillator 20, 22.

FIG. 3 is a timing diagram that shows the relationship between an oscillator signal 50, from the voltage controlled oscillators 20, 22, and a transmitter signal 52. The transmitter 28 generates a transmit sequence 54 at a first predetermined trigger point (predetermined edge) 55 of the oscillator signal 50. A comparison sequence 56 is generated by the transmitter 28 at a second predetermined trigger point 58 or a predetermined number of edges after the transmit sequence was generated. The comparison sequence 56 is sent to the detection and comparison electronics 32 and is compared to the received signal from the receiver 30.

Figure 4:
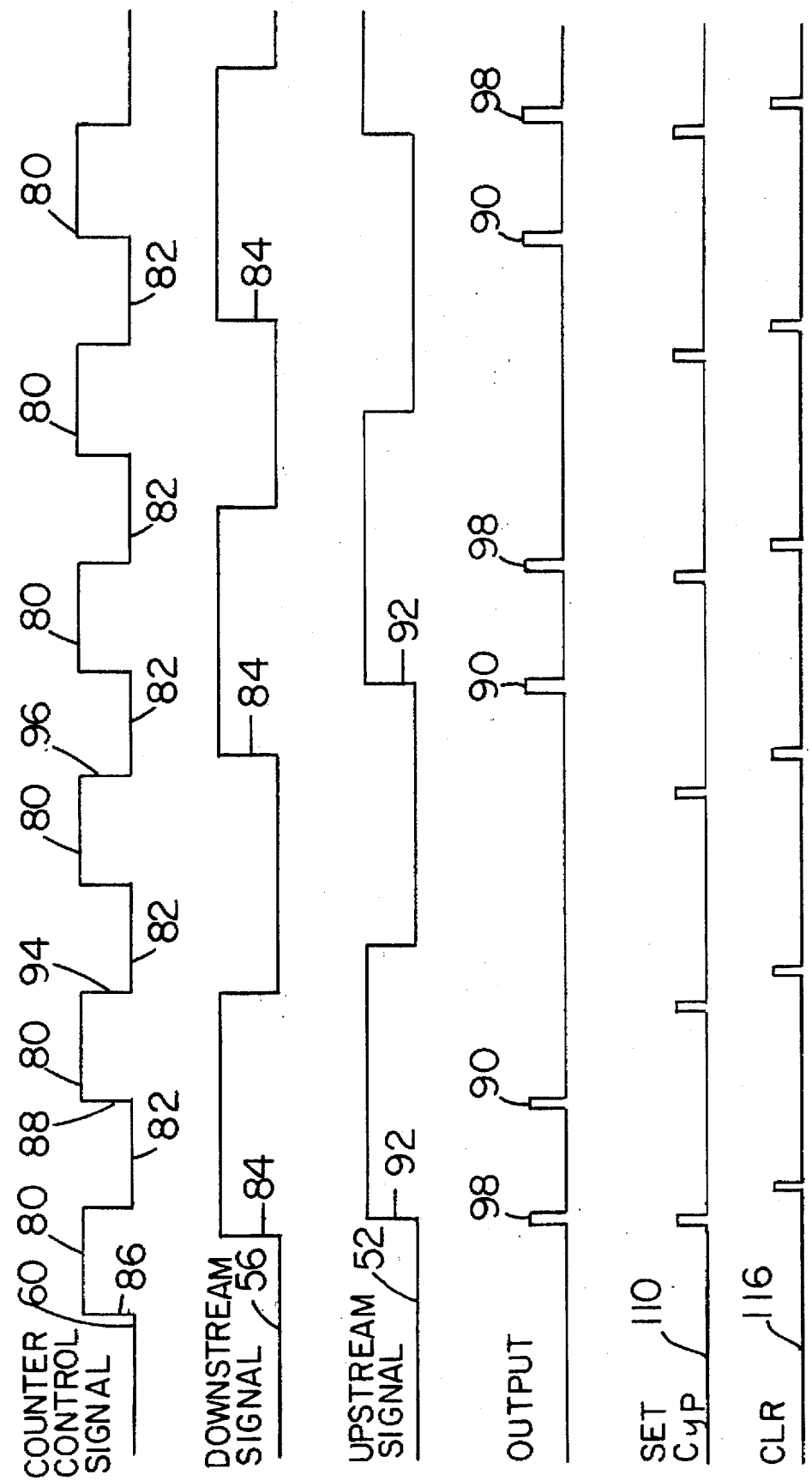
FIG. 4 is a timing diagram of another portion of the process of detecting and aligning a signal.

FIG. 4 is a timing diagram showing the detail of the transmit sequence 54, an output (transmit waveform) 60 of the transmit transducer and a received signal 62. Note the comparison sequence 56 is the same sequence as the transmit sequence 54. The transmit sequence is a number of square waves (periodic waveform). The first four (first predetermined number) square waves 64 have a first period 66. Then there is a square wave (second predetermined number) 68 having a shorter period (second period) 70. This is followed by four (third predetermined number) square waves 72 having the first period (third period) 66. The period 66 is equal to the natural frequency of the transducer. This produces a sinusoidal signal 60, at the output of the transmit transducer, having four equal periods 74. Then the short period square wave 68 effectively changes the phase of the transmit signal 60 by 180 degrees. The transducer cannot immediately change phases, which results in a transmit anomaly (sequence anomaly) 76 followed by four cycles of the sinusoidal signal 78 at the transducers natural frequency. When this signal is received by the receive transducer it is passed through a limiter to form the receive sequence 62. The received sequence (without noise) looks like an inverted version of the transmit sequence except that the short cycle 68 or transmit anomaly 76 is a wide pulse (aperiodicity, anomaly) 80. This anomaly (aperiodicity) 80 is key to detecting the sonic packet 54.

Figure 5:
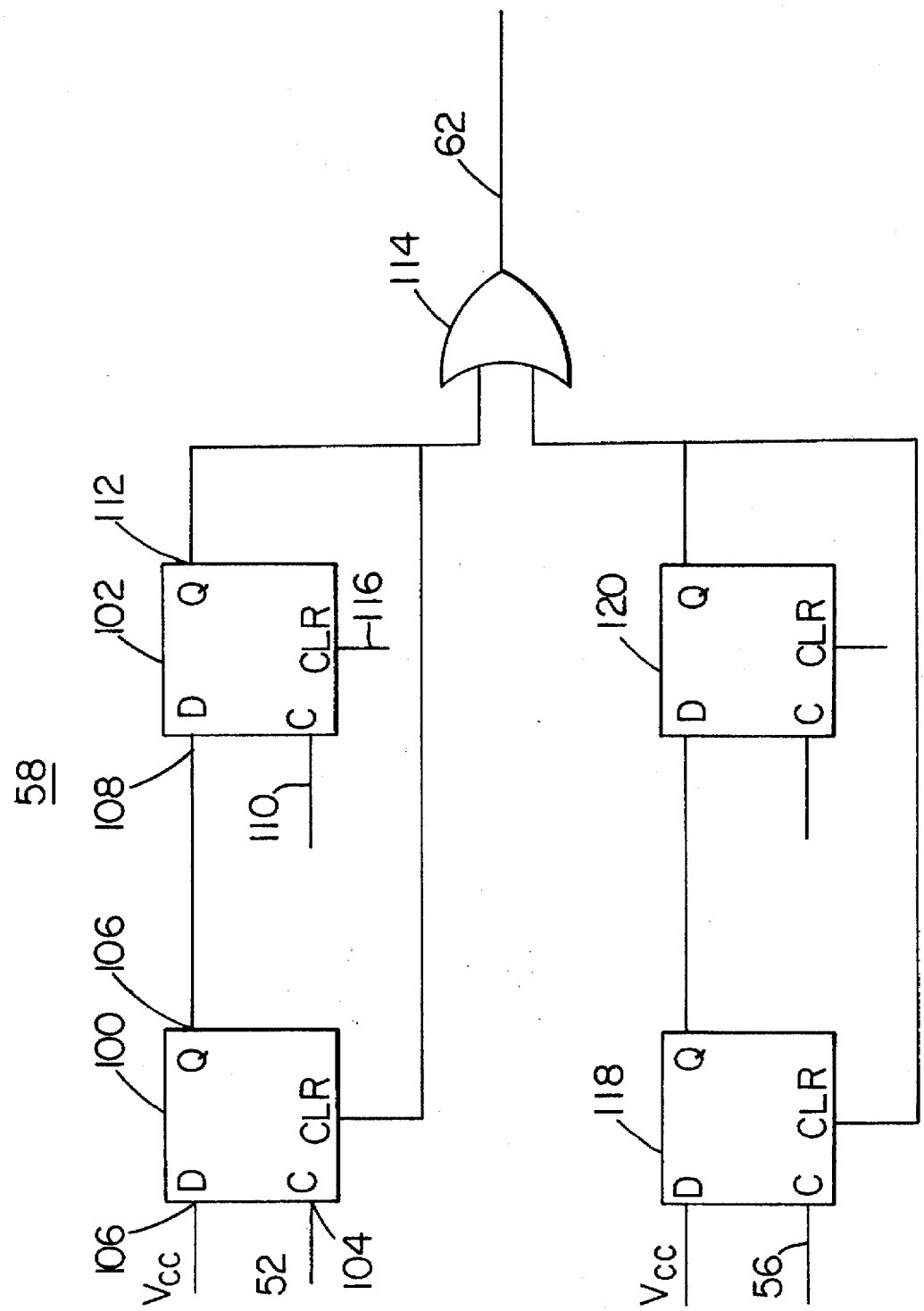
FIG. 5 is a timing diagram of another portion of the process of detecting and aligning a signal.

FIG. 5 shows how the detection and comparison electronics 32 processes the received sequence 62 to detect the received signal and align the oscillator with the received signal. The detection and comparison electronics 32 measures the pulse widths 82 of both the positive and negative pulses. The pulse widths (plurality of pulse widths) are then categorized as fitting within a first width range or within a second width range. Those pulses in the first width range are represented by a short pulse 84 on a first pulse signal 86. Those pulses in the second width range are represented by a short pulse 90 on the second pulse line 92. The detection and comparison electronics 32 uses this information to generate a slew alignment signal 94. The slew alignment signal 94 goes high 96 at the third short pulse 84 on the first pulse signal 86, after the short pulse 90 on the second pulse line 92. The detection and comparison electronics 32 compares the edge (slew alignment point) 96 with a first gate signal 98, generated by the transmitter, to determine if the edge 96 occurs when the first gate signal 98 is true 100. When the edge 96 does not overlap the pulse 100, the edge 96 is compared to the pulse 100 to form a slew alignment signal that is used to adjust the frequency of the oscillator signal. The slew alignment signal is a crude fast adjustment of the oscillator's frequency.

When the edge 96 does overlap the pulse 100, the detection and comparison electronics 32 generates a fine alignment signal (fine alignment point) 102 that transitions at the last pulse 84 before the pulse 90. This is compared to an estimate signal (estimate point) 104, that is generated from the transmitter comparison sequence 56. The result is an early-late control signal that is used for fine adjustment of the oscillator frequency.

Detection of the received signal is determined by requiring that at least six of the pulses 84 (short pulse widths) occur before the pulse 90 (long pulse width 80). In addition, the electronics 32 must receive at least three pulses 84 (short pulse widths) for the logic to determine a valid signal was received. This significantly reduces the probability of false detection by the ultrasonic flow meter. In addition, the pattern is more easily distinguished in the presence of noise, since pulse widths can be determined within fairly large ranges. This is a considerably improvement over the prior art, which first looks for a signal that is larger than a threshold and then measures the next positive zero crossing. The prior art makes it difficult to determine where in the ultrasonic packet the detection occurred. Also the prior art is more likely to have a false positive in the presence of large noise and may miss a pulse if the threshold is set to high.

Figure 6:
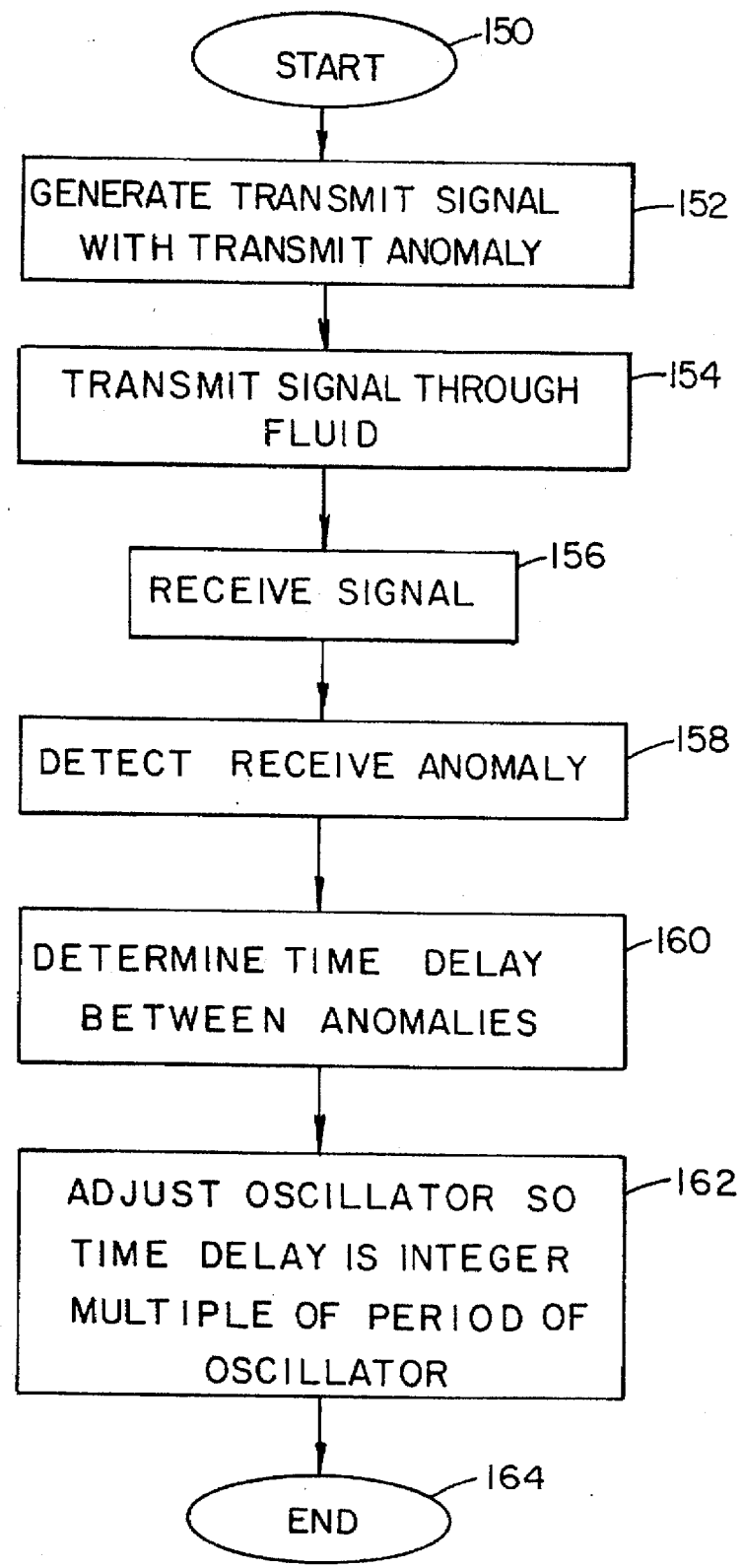
FIG. 6 is a flow chart of the process of detecting and aligning a signal.

FIG. 6 is a flow chart of the process of detecting and aligning a signal in an ultrasonic flow meter. The process starts, step 150, by generating a transmit signal having a transmit anomaly at step 152. The signal is then transmitted through the flowing fluid at step 154. The signal is received at step 156. The receive anomaly in the signal is detected at step 158. Next the time delay between the transmit anomaly and the receive anomaly is determined at step 160. The oscillator signal is then adjusted so that the time delay is equal to a integer multiple of the period of the oscillator signal at step 162, which ends the process, step 164.

Once both the upstream and downstream oscillators have been adjusted the oscillator signals can be mixed to find a beat frequency that is proportional to the speed of the fluid flowing in the pipe.

Figure 7:
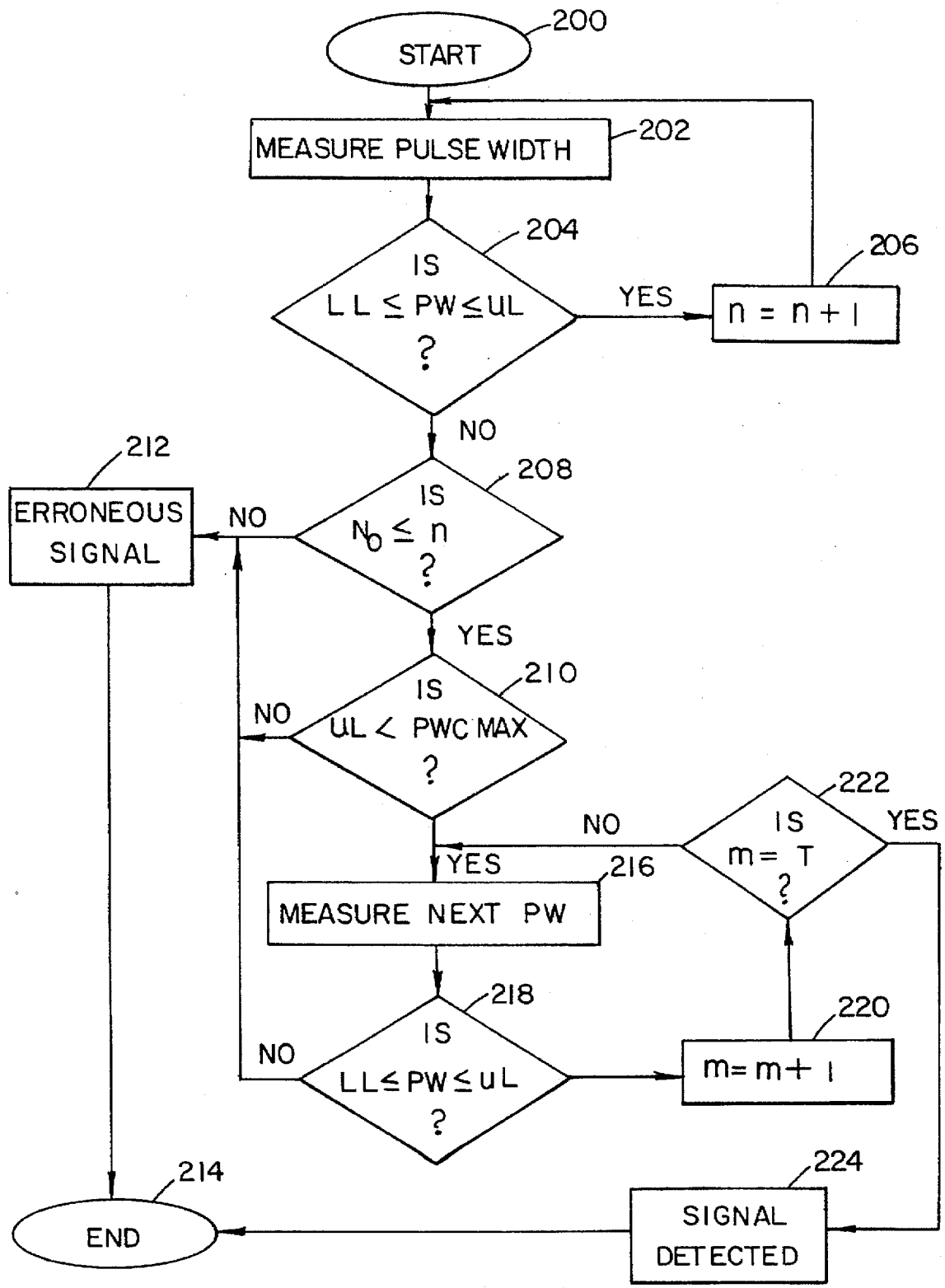
FIG. 7 is a flow chart of another embodiment of the process of detecting a signal.

FIG. 7 is a flow chart of the process of detecting the signal. The process starts, step 200, by measuring the pulse width (first pulse width) of the receive sequence at step 202. At step 204 it is determined if the pulse width (PW) is between a lower limit (LL) and an upper limit (UL). When the pulse width is within the first range, the pulse is counted as fitting within the first range at step 206. The processing then returns to step 202. This loop 202–206 allows us to determine if we have received at least six short pulses.

When the pulse width is not within the first range at step 204, it is determined at step 208 if the number (first number) of pulses (n) within the first range that were received before the present pulse (following pulse) is at least a lower number ($N_o$). When the number (n) is at least six in the preferred embodiment, it is determined if the pulse width is greater than the upper limit and less than a maximum at step 210. When the number is not at least six an erroneous signal detected is sent at step 212 and processing ends, step 214.

When the pulse width of the following pulse is not greater than the upper limit or greater than a maximum at step 210, processing proceeds to step 212. When the pulse width of the following pulse (following pulse width) is greater than the upper limit and less than a maximum at step 210, the next pulse width is measured at step 216. Next it is determined if this pulse width is between the lower limit and the upper limit at step 218. When the pulse width is not within the range at step 218, processing proceeds to step 212. When the pulse width is within range at step 218, the pulse is counted at step 220. At step 222 it is determined if the number (m) of pulses is equal to a third predetermined number (T). In the preferred embodiment the number T is three. When the number of pulses is not equal to the third predetermined number, processing returns to step 216. When the number of pulses is equal to the third predetermined number at step 222, the signal has been detected, step 224, ending the process, step 214. In the preferred embodiment, the process and apparatus are used with transducers inside the conduit.

The process described herein can be implement in hardware (logic circuits) or in software. Whether the process is implemented in software or hardware is a design choice, that is based on cost and processing speed. Presently the preferred embodiment is to implement the process in hardware due to cost and speed considerations.

Thus there has been described a method and apparatus for detecting and aligning a signal in an ultrasonic flow meter, even in the presences of noise. The invention has fewer false detections and missed detection than the prior art. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of detecting and aligning a signal in an ultrasonic flow meter, comprising the steps of:
   (a) generating an oscillator signal;
   (b) generating a transmit sequence on a first predetermined trigger point of the oscillator signal;
   (c) driving a transmit transducer with the transmit sequence to form a transmit waveform;
   (d) receiving the transmit waveform at a receive transducer to form a received waveform;
   (e) processing the received waveform to form a received sequence; and
   (f) detecting the received sequence by sensing an anomaly.

2. The method of claim 1, further including the steps of:
   (g) generating a comparison sequence on a second predetermined trigger point of the oscillator signal;
   (h) comparing the comparison sequence to the received sequence to form an early-late control signal;

(i) adjusting the oscillator signal based on the early-late control signal.

3. The method of claim 1, wherein step (f) further includes the steps of:
   (f1) determining a plurality of pulse widths in the received sequence;
   (f2) determining if a first predetermined number of the plurality of pulse widths are within a range;
   (f3) when the first predetermined number of the plurality of pulse widths are within the range, determining if a following pulse width of the plurality of pulse widths is outside the range;
   (f4) when the following pulse width is outside the range, determining that the received signal has been detected.

4. The method of claim 3, further including the steps of:
   (f5) when the first predetermined number of the plurality of pulse widths are not within the range, determining the received signal has not been detected.

5. The method of claim 3, further including the step of:
   (f5) when the following pulse width is inside the range, sending an erroneous signal detected.

6. The method of claim 1, wherein step (b) further includes the steps of:
   (b1) generating a predetermined number of a periodic waveform having a first period;
   (b2) generating a second predetermined number of the periodic waveform having a second period;
   (b3) generating a third predetermined number of the periodic waveform having the first period.

7. The method of claim 1, wherein sensing the anomaly includes sensing an aperiodicity in the received sequence.

8. The method of claim 1, further including the steps of:
   (g) generating the transmit sequence, and a first gate signal;
   (h) determining if the first gate signal overlaps a slew alignment point of the received sequence;
   (i) when the first gate signal does overlap the slew alignment point, comparing a fine alignment point of the received signal with an estimated point of arrival generated by the oscillator signal, to form an early-late control signal;
   (j) adjusting the oscillator signal based on the early-late control signal.

9. The method of claim 8, further including the steps of:
   (k) when the first gate signal does not overlap the slew alignment point, comparing the first gate signal to the slew alignment point to form the slew alignment signal.

10. An apparatus for detecting and aligning a signal in an ultrasonic flow meter, comprising:
    a transmitter receiving an oscillator signal, the transmitter generating a transmit sequence and a comparison sequence;
    a transmit transducer receiving the transmit sequence and transmitting a transmit waveform through a fluid in a conduit;
    a receive transducer receiving the transmit waveform and transmitting a received waveform;
    a receiver electronics processing the received waveform to form a received sequence; and
    a detection and comparison electronics detecting an anomaly in the received sequence.

11. The apparatus of claim 10, wherein the detection and comparison electronics compare the comparison sequence with the received sequence.

12. The apparatus of claim 11, wherein the detection and comparison electronics generates an early-late control signal to adjust the oscillator signal.

13. The apparatus of claim 12, wherein the transmitter generates the transmit sequence at a predetermined edge of the oscillator signal.

14. The apparatus of claim 13, wherein the transmitter generates the comparison sequence at a predetermined number of edges after the transmit sequence is generated.

15. The apparatus of claim 10, wherein the detection and comparison electronics first detects a first number of pulse widths within a range and then detects a following pulse width outside the range to determine the received sequence was the transmitted sequence.

16. A method of detecting and aligning a signal in an ultrasonic flow meter, comprising the steps of:
    (a) generating a transmit signal having a transmit anomaly;
    (b) transmitting the transmit signal through a fluid;
    (c) receiving the transmit signal to form a received signal;
    (d) detecting a received anomaly in the received signal; and
    (e) determining a time delay between the transmit anomaly and the received anomaly;
    (f) adjusting an oscillator signal, used to initiate the transmit sequence, so that the time delay is an integer multiple of a period of the oscillator signal.

17. The method of claim 16, wherein step (d) involves the steps of:
    (d1) detecting a plurality of pulse widths within a range;
    (d2) determining if a following pulse width is outside the range;
    (d3) when the following pulse width is outside the range, determining that the received sequence was the transmitting sequence.

18. The method of claim 16, wherein step (a) further includes the steps of:
    (a1) generating a transmit sequence at a predetermined edge of an oscillator signal, the transmit sequence having a sequence anomaly;
    (a2) driving a transmit transducer with the transmit sequence to form a transmit signal having the transmit anomaly.

19. The method of claim 18, wherein step (a1) further includes the steps of:
    (i) generating a first predetermined number of cycles of a periodic waveform, the first predetermined number of cycles having a first period;
    (ii) generating a second predetermined number of cycles of the periodic waveform, the second predetermined number of cycles having a second period;
    (iii) generating a third predetermined number of cycles of the periodic waveform, the third predetermined number of cycles having a third period.

* * * * *